US008272404B2

(12) United States Patent
Brunskill et al.

(10) Patent No.: US 8,272,404 B2
(45) Date of Patent: Sep. 25, 2012

(54) FLUIDIC IMPULSE GENERATOR

(75) Inventors: Douglas James Brunskill, Calgary (CA); Robert Standen, Calgary (CA)

(73) Assignee: Baker Hughes Incorporated, Houston, TX (US)

(*) Notice: Subject to any disclaimer, the term of this patent is extended or adjusted under 35 U.S.C. 154(b) by 366 days.

(21) Appl. No.: 12/608,248

(22) Filed: Oct. 29, 2009

(65) Prior Publication Data

US 2011/0100468 A1 May 5, 2011

(51) Int. Cl.
*F16C 1/08* (2006.01)

(52) U.S. Cl. ........................................ 137/835; 137/837

(58) Field of Classification Search .................. 137/841, 137/834, 837, 836, 835, 839, 840; 239/60, 239/255, 260

See application file for complete search history.

(56) References Cited

U.S. PATENT DOCUMENTS

| | | | | |
|---|---|---|---|---|
| 2,291,731 | A * | 8/1942 | Lake et al. | 137/484.2 |
| 3,124,999 | A | 3/1964 | Woodward | |
| 3,340,896 | A | 9/1967 | Mon et al. | |
| 3,371,675 | A * | 3/1968 | Hatch, Jr. | 137/835 |
| 3,842,907 | A * | 10/1974 | Baker et al. | 166/249 |
| 4,800,922 | A | 1/1989 | Bratland | |
| 5,135,051 | A | 8/1992 | Facteau et al. | |
| 5,165,438 | A | 11/1992 | Facteau et al. | |
| 5,195,560 | A | 3/1993 | Achmad | |
| 5,230,389 | A | 7/1993 | Besson | |
| 5,505,262 | A * | 4/1996 | Cobb | 166/312 |
| 5,836,393 | A * | 11/1998 | Johnson | 166/308.1 |
| 5,893,383 | A | 4/1999 | Facteau | |
| 5,983,943 | A | 11/1999 | Parry et al. | |
| 6,021,095 | A * | 2/2000 | Tubel et al. | 367/82 |
| 6,279,670 | B1 | 8/2001 | Eddison et al. | |
| 6,321,790 | B1 | 11/2001 | Carver et al. | |
| 6,408,886 | B1 | 6/2002 | Milano, Jr. et al. | |
| 6,768,214 | B2 * | 7/2004 | Schultz et al. | 290/1 R |
| 6,976,507 | B1 | 12/2005 | Webb et al. | |
| 7,139,219 | B2 | 11/2006 | Kolle et al. | |
| 2006/0237187 | A1 * | 10/2006 | Stoesz et al. | 166/177.6 |
| 2007/0284106 | A1 * | 12/2007 | Kalman et al. | 166/298 |
| 2009/0008088 | A1 * | 1/2009 | Schultz et al. | 166/249 |

FOREIGN PATENT DOCUMENTS

| | | | |
|---|---|---|---|
| CA | 2493340 | A1 | 8/2006 |
| WO | WO2005093264 | A1 | 10/2005 |

OTHER PUBLICATIONS

"HydroPull Extended Reach Tool Website at http://www.tempresstech.com/page.php?page_id=8, Oct. 29, 2009", pp. 2, vol. 2009, Publisher: Tempress Technologies, Inc. 2009.

International Search Report and Written Opinion issued in corresponding application No. PCT/US2010/050536 dated Jan. 3, 2011.

* cited by examiner

*Primary Examiner* — Craig Schneider
*Assistant Examiner* — Seth Faulb
(74) *Attorney, Agent, or Firm* — Parsons Behle & Latimer

(57) ABSTRACT

A device for vibrating tubing as it is inserted into a wellbore is disclosed. The device has a fluidic switch that has no moving parts. The fluidic switch is connected to a piston that oscillates back and forth in a cylinder. The piston is the only moving part. As the piston oscillates, it blocks and unblocks openings in the cylinder or other components. The movement of the piston controls the timing of the oscillation, and also generates an impulse or vibration. The vibration may reduce the friction between the tubing and the wellbore.

8 Claims, 12 Drawing Sheets

FLUIDIC IMPULSE GENERATOR

BACKGROUND

The present application relates generally to tubing insertion. More specifically, the present application relates to a vibratory device with a fluidic impulse generator that may reduce the effective friction between tubing and, for example, a wellbore, as it is inserted into the wellbore.

Devices that reduce the effective friction between tubing and an adjacent surface, as the tubing is moved from one location toward another, are generally used at an end of a tubing string. For example, reeled tubing may be inserted into a wellbore. The tubing may, in some examples, extend miles into the wellbore, which may be horizontal or vertical. There is friction between the wellbore and the tubing which builds as more tubing is inserted into the wellbore (i.e. there is more surface area contact between the wellbore and the tubing). At some point, the tubing can no longer be inserted into the casing by pushing it, due to the large amount of friction between the tubing and the casing and/or wellbore. As such, devices that help with tubing insertion are known and used to aid in the insertion process.

A device that creates periodic pulses to move and reposition the tubing as it is inserted into the wellbore is one type of device used to aid with tubing insertion. Typically, periodic pulsing devices use a device such as a Moineau motor or a mud motor, to create an oscillatory action, which may vibrate the end of the tubing, reducing the effective friction between at least a portion of the tubing and the wellbore. The oscillatory device may be coupled to other mechanisms that create various movements and/or pulses, such as mechanisms that block and unblock fluid flow. Generally, these prior art devices have produced periodic pulses similar to a sinusoidal wave.

Oscillatory devices are typically positioned within the tubing and are powered by the main fluid flow. Devices of this sort are often about six feet in length, or longer, and may comprise a plurality of moving parts. Generally, devices with a plurality of moving parts require frequent maintenance and must remain within suitable temperature and pressure tolerances to operate properly.

The present disclosure is directed toward overcoming, or at least reducing the effects of one or more of the issues set forth above.

SUMMARY

An embodiment of a vibratory impulse generator assembly is disclosed. The vibratory impulse generator assembly may comprise a fluidic switch having a first power path and a second power path, a piston in communication with the fluidic switch and positioned within a cylinder, and an interruption valve positioned inline with a fluid passage. The piston may be configured to actuate the interruption valve. The first power path may be connected to a first side of the cylinder and the second power path may be connected to a second side of the cylinder.

The vibratory impulse generator assembly may further comprise a cap connected to the fluidic switch. The cap may be configured to be connected to a length of tubing. The vibratory impulse generator assembly may have a total length of two feet or less. The interruption port may be configured to substantially stop fluid from moving through the fluid passage when actuated by the piston. The vibratory impulse generator assembly may be configured to generate a periodic impulse. The vibratory impulse generator assembly may be configured to be turned on remotely. The vibratory impulse generator assembly may further comprise a first actuated valve. The first actuated valve may be configured to be actuated with a ball. The vibratory impulse generator assembly may be configured to be turned off remotely. The vibratory impulse generator assembly may further comprise a second actuated valve. The second actuated valve may be configured to turn off the vibratory impulse generator assembly. The first actuated valve may be configured to be actuated with a ball.

An embodiment of a fluidic switch is disclosed. The fluidic switch may comprise a power input path, a connecting power path connected to the power input path, a first power path connected to the connecting power path, a second power path connected to the connecting power path, a first trigger path connected to the connecting power path, and a second trigger path connected to the connecting power path. The fluidic switch may further comprise a first feedback path connected to the connecting power path, a second feedback path connected to the connecting power path, a first feedback channel connected to the first power path and to the first feedback path, and a second feedback channel connected to the second power path and to the second feedback path. The fluidic switch may further comprise a top piece and a bottom piece. The top piece may comprise the connecting power path, the first power path, the second power path, the first trigger path, and the second trigger path. The bottom piece may comprise the first feedback channel, and the second feedback channel.

The fluidic switch may be in fluid communication with an oscillatory device. The oscillatory device may be a piston in a cylinder. The piston may have one or more piston trigger ports that are configured to communicate fluid to the first trigger path or the second trigger path. The oscillatory device may be configured to interrupt a fluid flow to thereby generate an impulse. The impulse may be periodic. The fluidic switch may be a solid state device.

A method of generating a periodic impulse is disclosed. The method may comprise injecting fluid into a first side of a cylinder. The cylinder may be filled with fluid. The injection may cause a piston positioned within the cylinder to move away from the first side of the cylinder. The piston may push fluid out of a second side of the cylinder. The method may further comprise blocking a first port with at least a portion of the piston to substantially stop a flow of a fluid through a main passage. Blocking the first port may create an impulse. The method may further comprise injecting fluid into the second side of the cylinder, which may cause the piston to move away from the second side of the cylinder, which may push fluid out of the first side of the cylinder. The method may further comprise unblocking the first port.

The method of generating a periodic impulse may further comprise creating fluid communication between the main passage and a first trigger port when the piston is near the second side of the cylinder. The fluid communication between the main passage and the first trigger port may stop the injection of fluid into the first side of the cylinder and start the injection of fluid into the second side of the cylinder. Fluid may be injected by a fluidic switch. The fluidic switch may be a solid state device. The method may further comprise stopping the periodic impulse generation by opening a second port that bypasses the first port. The fluid may continue to flow through at least a portion of the main passage when the first port is blocked and the second port is opened. The method may further comprise pumping an object through the main passage to open the second port. The object may be a ball.

These and other embodiments of the present application will be discussed more fully in the description. The features, functions, and advantages can be achieved independently in various embodiments of the claimed invention, or may be combined in yet other embodiments.

BRIEF DESCRIPTION OF FIGURES

Like reference numbers and designations in the various drawings indicate like elements.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modifications to the various disclosed embodiments may be made, and other embodiments may be utilized, without departing from the spirit and scope of the present invention. The following detailed description is, therefore, not to be taken in a limiting sense.

Figure 1:
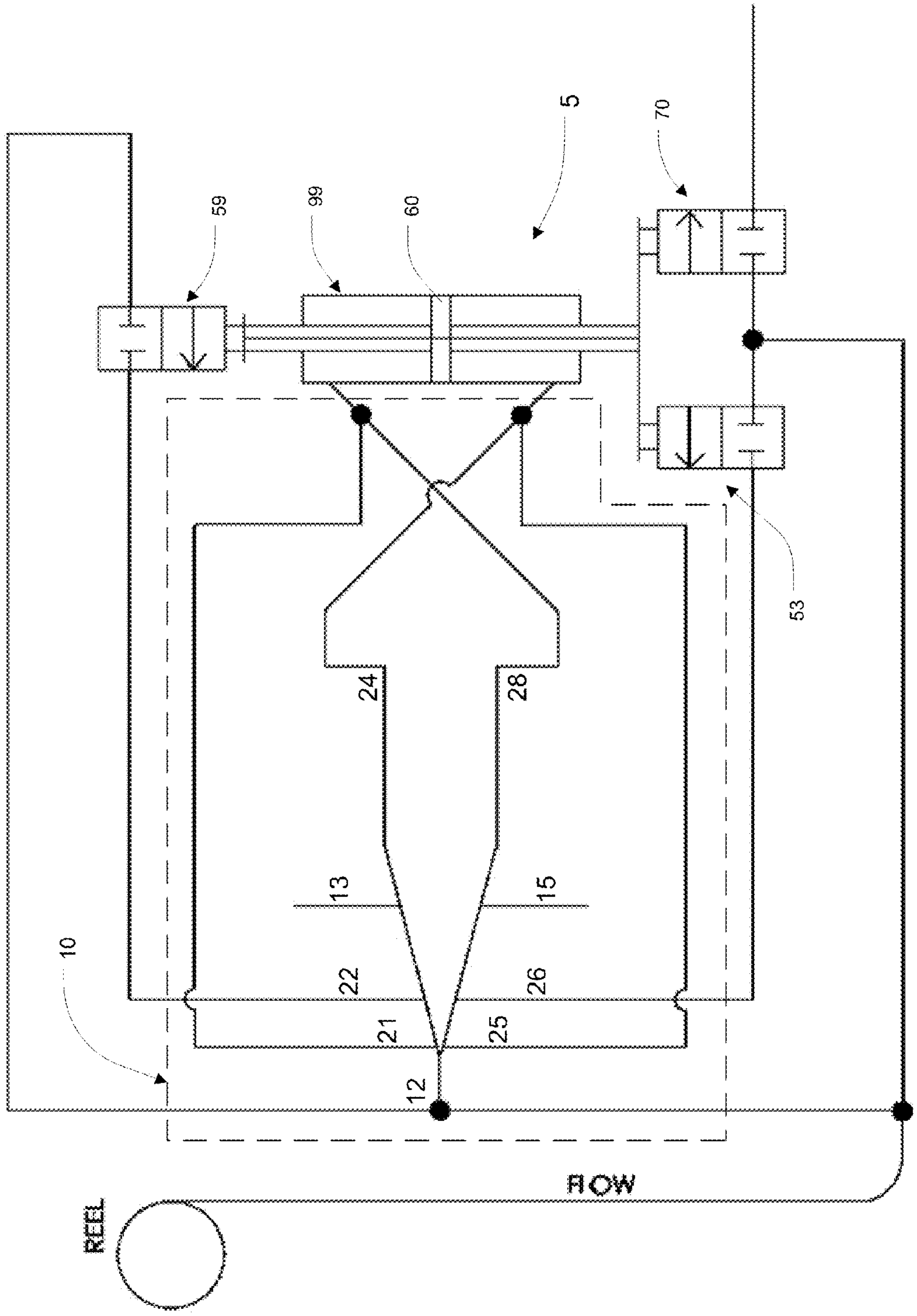
FIG. 1 is a schematic of a an embodiment of a vibratory impulse generator.

FIG. 1 is a schematic of an embodiment of a vibratory impulse generator assembly 5. The vibratory impulse generator assembly 5 comprises a fluidic switch 10 having a power input 12, a first feedback port 21, a second feedback port 25, a first trigger port 22, a second trigger port 26, a first power path 28, and a second power path 24. Additionally, a first wellbore vent port 13 and a second wellbore vent port 15 are shown.

The fluidic switch 10 operates on the Coandă effect, which is the tendency for a fluid to follow the contour of a surface that it is in contact with. The Coandă effect allows the fluidic switch 10 to controllably direct fluid flowing into the power input 12, through, for example, the first power path 28, without any moving parts. Once the flow is moving through first power path 28, the flow tends to follow the contour of the first power path 28. As such, it continues to flow along the first power path 28.

As shown in FIG. 1, the first feedback port 21 leads from the first power path 28 to a point near the power input, where the outer surfaces of the flow path begin to diverge. Fluid flowing through the feedback port 21 may act to reinforce the path of the fluid flowing along the path of the first power path 28, creating a first reinforcing feedback loop.

The fluid flow may be switched to flow along the second power path 24 with an injection of fluid into the second trigger port 26 of the fluidic switch 10. The fluid injected into the fluidic switch 10 from the second trigger port 26 may interrupt the flow of fluid as it follows the contour of the first power path 28, and may redirect the flow of fluid to the second power path 24. Because the Coandă effect will continue to pull the newly redirected fluid, toward the second power path 24, the flow from the first trigger port 26 may be reduced or stopped after the redirection has taken hold. Additionally, the second feedback port 25 will act to reinforce the flow direction of the second power path 24. Similarly, the flow may be switched back to the first power path 28 through an injection of fluid through the first trigger port 22.

The vibratory impulse generator assembly 5 further comprises a cylinder 99 within which a piston 60 is free to move along the length of the cylinder 99, to its extremities. As shown in FIG. 1, the first power path 28 is connected to one side of the cylinder 99, for example, a top side, and the second power path 24 is connected to another side of the cylinder 99, for example, a bottom side. Because the piston 60 is free to move along the path within the cylinder 99, the piston can be powered toward one side of the cylinder 99 or the other by fluid moving through the first power path 28 or the second power path 24. For example, fluid flowing through the first power path 28 may power the piston 60 toward the bottom side of the cylinder 99 while, at the same time, pushing fluid that is within the bottom of the cylinder 99 through the second power path 24. In this example, fluid flowing through the second power path 24 is vented to the wellbore through the second wellbore vent port 13.

A number of fluidic switches are also shown in FIG. 1. A first trigger switch 59 is near the top of the cylinder 99 and a second trigger switch 53 is near the bottom of the cylinder. Also shown is an interrupt valve 70, near the bottom of the cylinder 99. The first trigger switch 59, normally closed, may be opened when the piston 60 is near the top of the cylinder 99. When the first trigger switch 59 opens, a flow of fluid may be allowed to move through a path to the first trigger port 22.

Similarly, the second trigger switch 53, normally closed, may be opened when the piston 60 is near the bottom of the cylinder 99, which may allow fluid to move through a path to the second trigger port 26.

Additionally, the interrupt valve 70, normally open, may be closed when the piston 60 is near the bottom of the cylinder 99. Closing the interrupt valve 70 may quickly and substantially stop a flow of fluid through the vibratory impulse generator assembly 5 or another associated device, mechanism, or pipe, creating a positive pressure wave, also known as a pressure pulse or an impulse. When the vibratory impulse generator assembly 5 is attached near an end of a length of tubing that is being inserted into a casing or wellbore, impulses generated by the vibratory impulse generator assembly 5 may reduce the effective friction between the casing and the tubing.

Figures 2A, 2B, 2C:
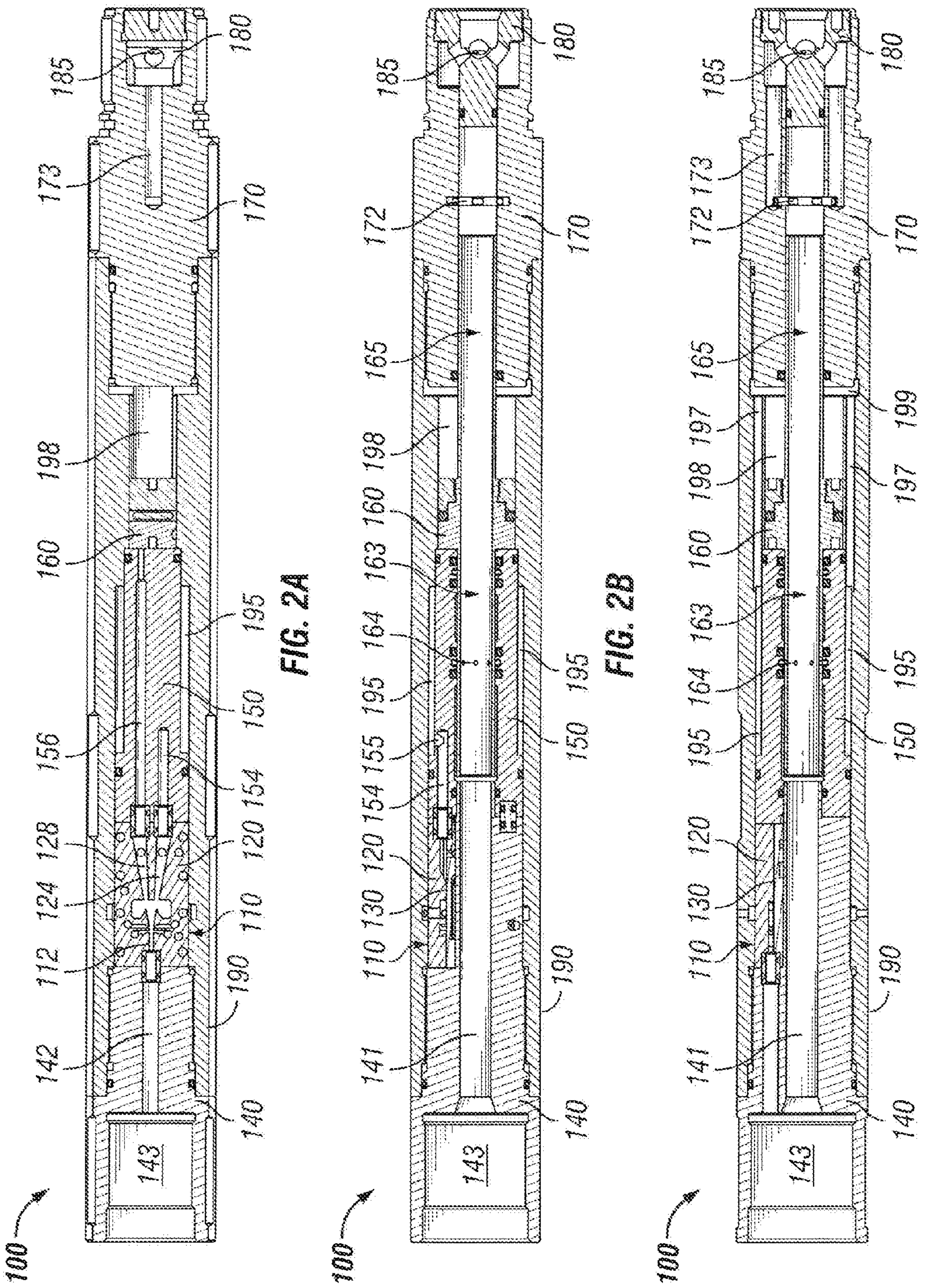
FIG. 2A is a cutaway top view of an embodiment of a vibratory impulse generator assembly.
FIG. 2B is a cutaway side view of the embodiment of FIG. 2A along cross section line C-C.
FIG. 2C is a cutaway side view of the embodiment of FIG. 2A along cross section line A-A.

An embodiment of a vibratory impulse generator assembly will now be described. FIG. 2A is a cutaway top view of an embodiment of a vibratory impulse generator assembly 100. The point of view is important for understanding the orientation of one or more portions shown in the figures. As such, while describing the vibratory impulse generator assembly 100, the viewing direction will often be specified. For example, referring to FIG. 2A, the components shown on the left hand side of the figure may be generally thought of as "upstream" with respect to the components shown on the right hand side, which may be generally thought of as "downstream" with respect to the components shown on the left hand side. Further, the directions of up, down, left and right are used with respect to a view of the vibratory impulse generator assembly 100 from upstream looking downstream.

Figures 2D, 2E, 2F:
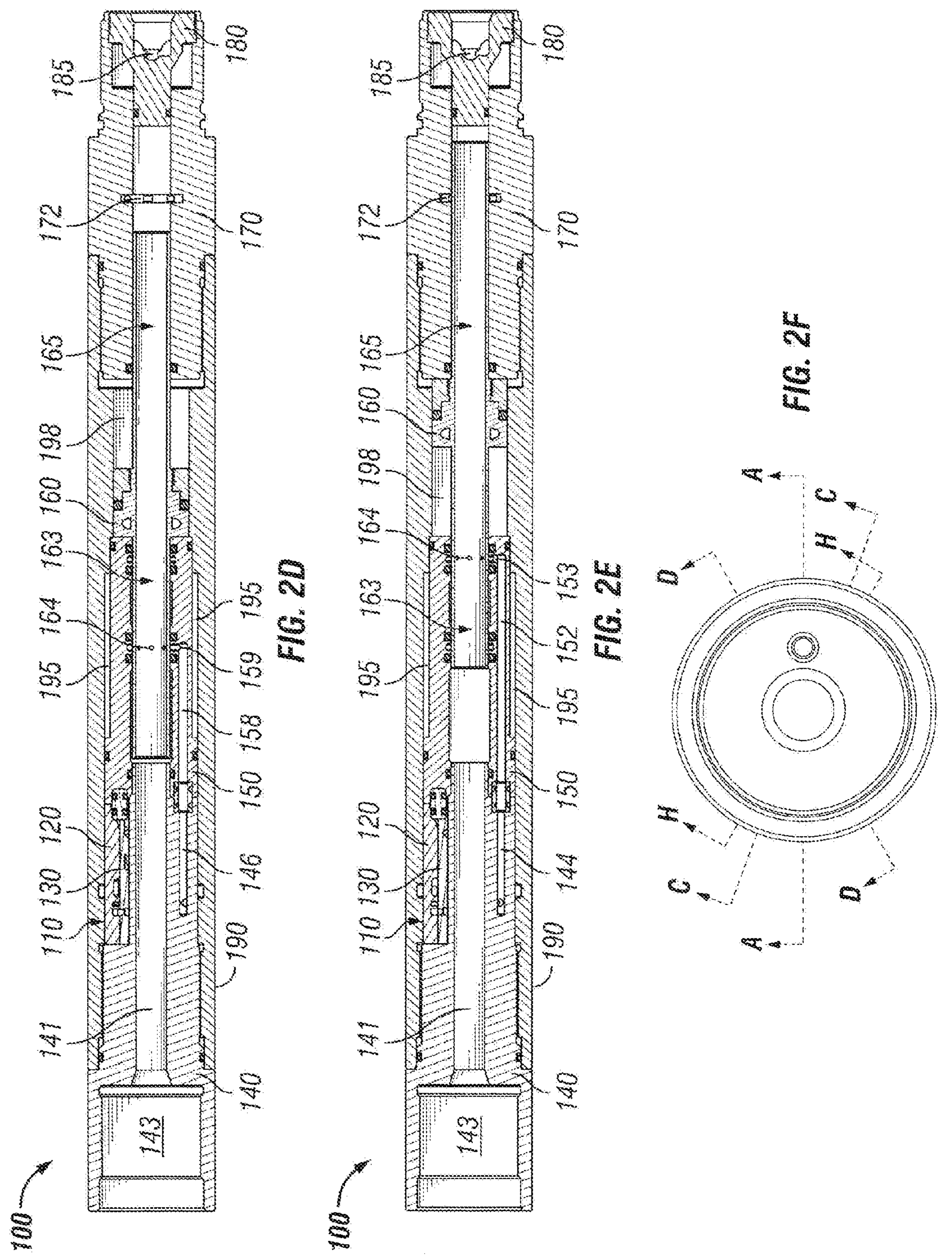
FIG. 2D is a cutaway side view of the embodiment of FIG. 2A along cross section line D-D.
FIG. 2E is a cutaway side view of the embodiment of FIG. 2A along cross section line H-H and with the piston positioned differently.
FIG. 2F is a front view of the embodiment of FIG. 2A, showing a plurality of cross section lines.

The view of FIG. 2A is from a top side looking toward a bottom side, and as such it may appear reversed from some other figures. FIG. 2F shows a front view of the vibratory impulse generator assembly 100, looking downstream, with a plurality of cross section lines, indicating the orientation of some figures. FIG. 2B is a cutaway side view of the embodiment of FIG. 2A, oriented along the C-C cross section. The vibratory impulse generator assembly 100 comprises a fluidic switch 110 connected to a cap 140. The cap 140 and fluidic switch 110 are further connected to a bulkhead 150. The cap 140, fluidic switch 110, and bulkhead 150 are inserted into a housing 190.

At the downstream end of the housing 190, an interruption valve 170 is connected to the housing 190. The interruption valve 170 is further connected to a plug 180. A piston 160 is positioned within a cylinder 198 created by the position of the bulkhead 150 and the interruption valve 170 within the housing 190. The bulkhead 150 accepts an end 163 of the piston 160 and the interruption valve 170 accepts the other end 165. One or more suitable seals may be used to capture and control fluid as it flows through one or more portions of the vibratory impulse generator assembly 100, as would be apparent to one of ordinary skill in the art given the benefit of this disclosure.

The vibratory impulse generator assembly 100 may be positioned at or near the front of a length of tubing as it is inserted into a wellbore. Pressurized fluid may be directed through the tubing and into the vibratory impulse generator assembly 100, of which the cap 140 may be the initial component.

Figure 6A:
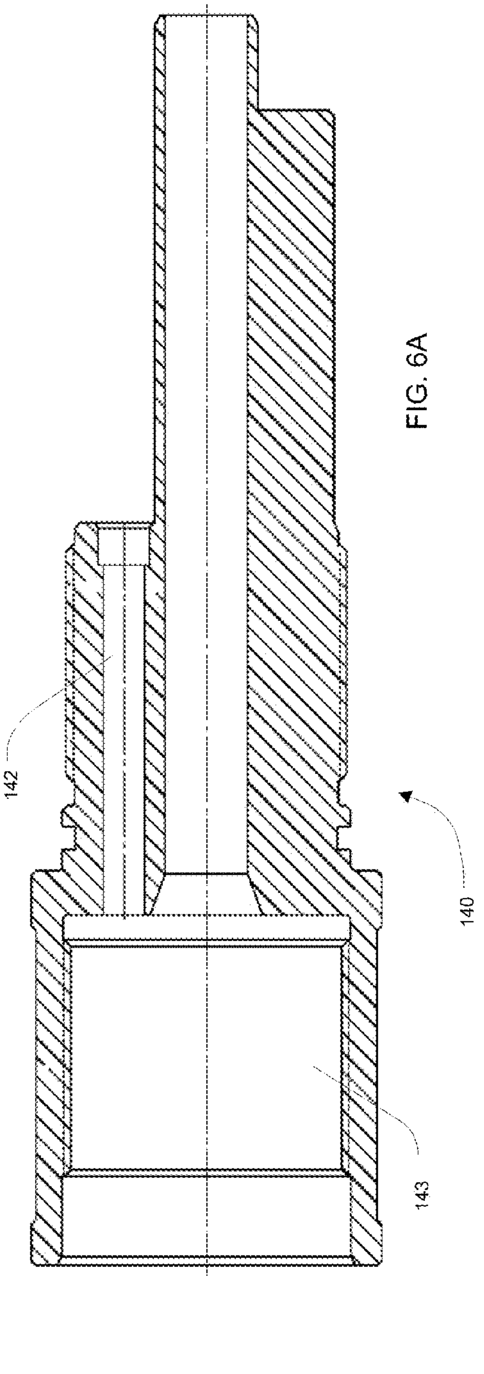
FIG. 6A is a cutaway side view of an embodiment of a cap.

The cap 140 may accept a main flow into a cap input port 143. From the cap input port 143, the fluid may flow into a cap main passage 141 or into a cap power path 142, best shown in FIG. 6A. The cap main passage 141 is larger than the cap power path 142 and handles most of the fluid that is introduced into the vibratory impulse generator assembly 100. The cap main passage 141 leads to main passages of other components, while the cap power path 142 leads to the fluidic switch 110.

Figure 3:
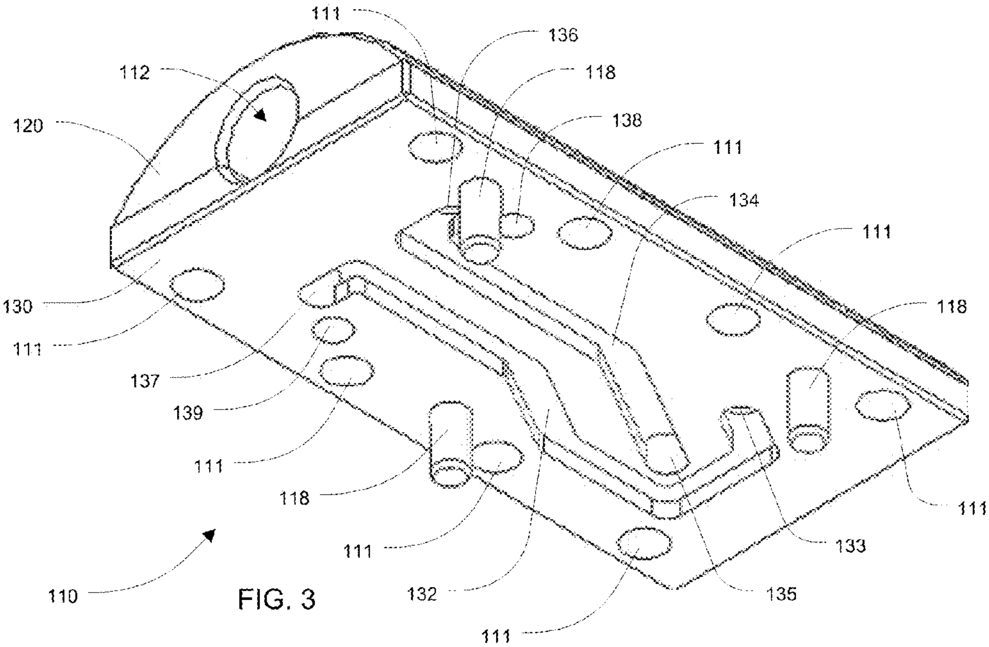
FIG. 3 is a perspective view of the bottom of an embodiment of a fluidic switch.

As shown in FIGS. 2B and 3, the fluidic switch 110 further comprises a top portion 120 and a bottom portion 130. FIG. 3 is a perspective view of the bottom of the fluidic switch 110. The fluidic switch 110 may connect to the cap 140 by one or more connectors or fasteners. As shown in FIG. 3, the fluidic switch 110 includes three pins 118 that may align and/or connect the fluidic switch 110 to the cap 140. Additionally shown in FIG. 3 are eight fastener apertures 111 that may accept fasteners when the fluidic switch 110 and the cap 140 are connected.

Figure 4A:
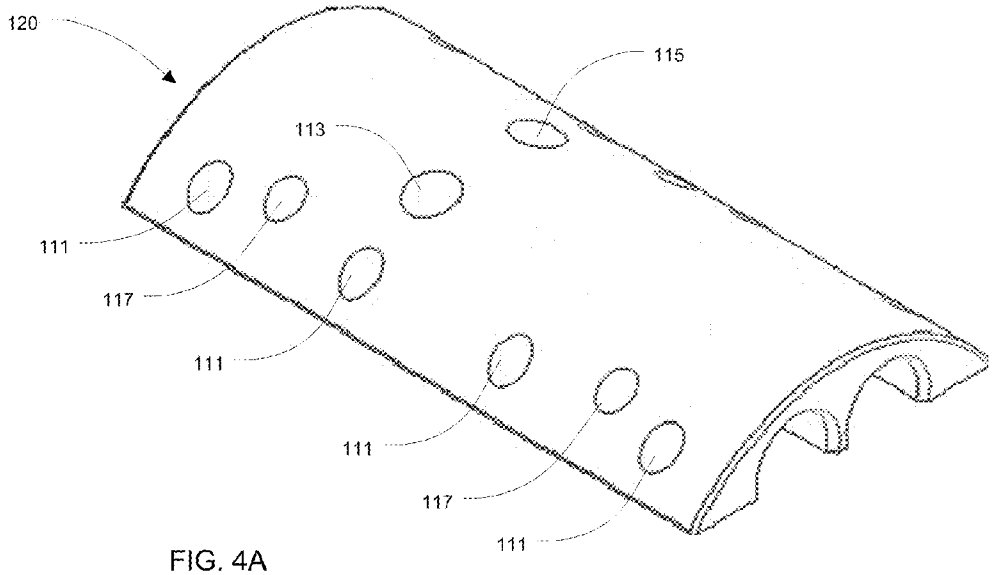
FIG. 4A is a perspective top view of an embodiment of a top portion of a fluidic switch.

FIG. 4A is a perspective view of the top portion 120 of the fluidic switch 110, looking upstream. As illustrated in FIG. 4A, the top portion 120 comprises a plurality of apertures including the aforementioned apertures 111, as well as pin apertures 117 that may accept pins 118 (shown in FIG. 3). Also shown are a first well bore vent 115 and a second well bore vent 113.

Figure 4B:
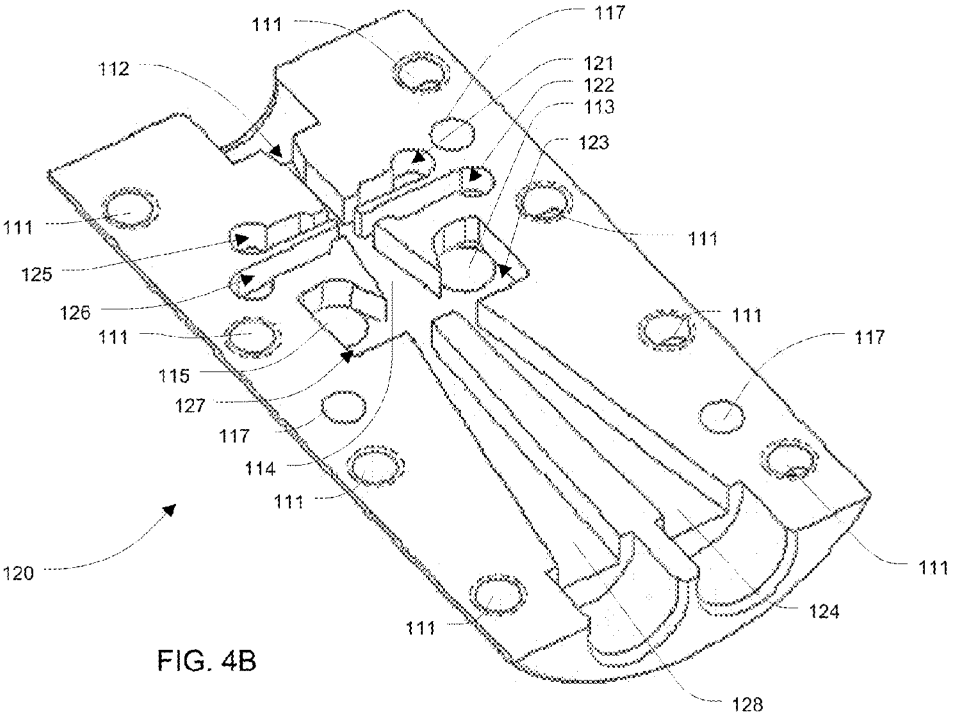
FIG. 4B is a bottom perspective view of the embodiment of FIG. 4A.
Figure 4C:
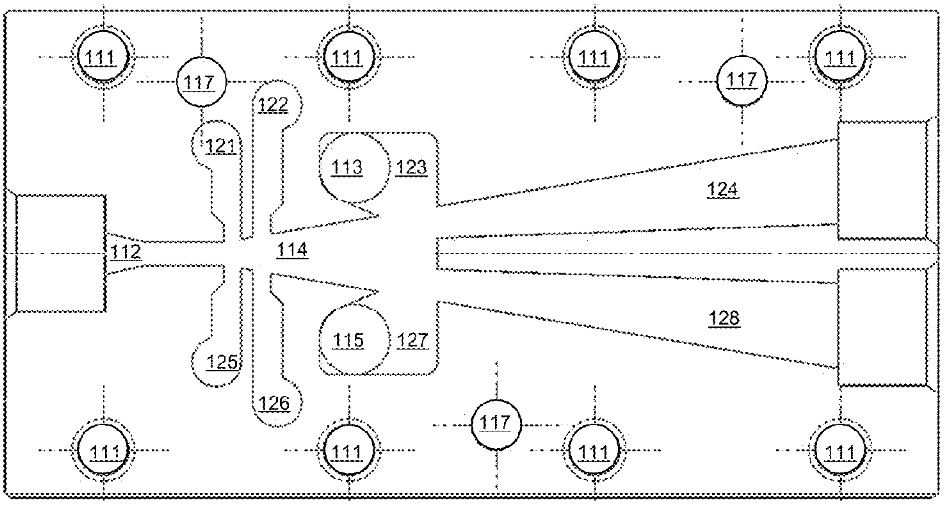
FIG. 4C is a bottom view of the embodiment of FIG. 4A.

FIG. 4B is a perspective view of the bottom of the top portion 120, looking upstream. FIG. 4C is a bottom view of the bottom of the top portion 120. A first power path 128 and a second power path 124 are at one end of the top portion 120, while an input power port 112 is at the opposite end, the first and second power paths 128, 124 being connected the input power port 112 by a connecting power path 114. The top portion 120 further comprises a first feedback path 121, a second feedback path 125, a first trigger path 122, and a second trigger path 126. Also shown in FIGS. 4B and 4C are a first well bore vent path 127, a second well bore vent path 123, as well as the associated first and second well bore vent ports 115, 113 respectively.

Figure 5A:
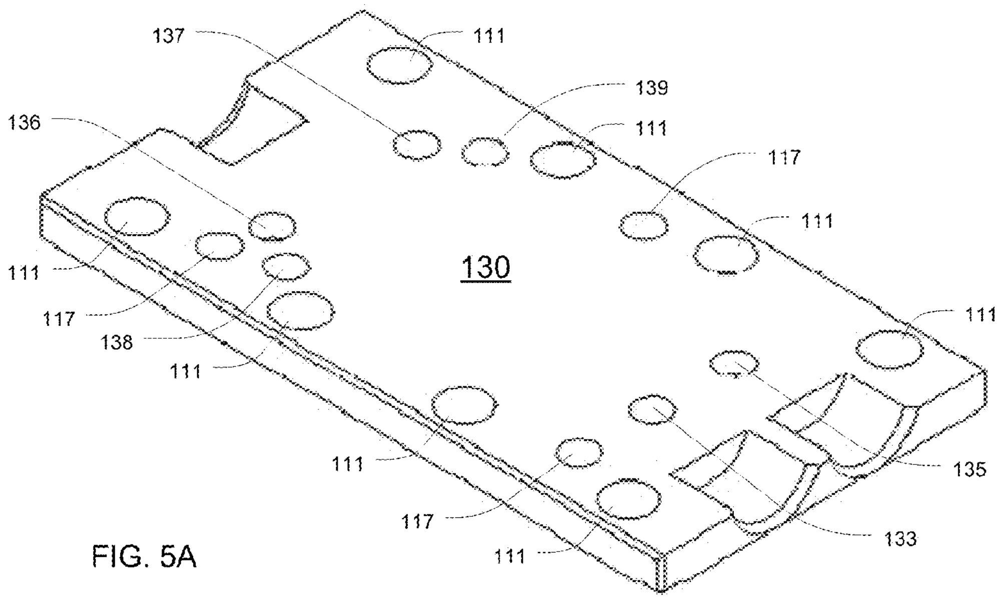
FIG. 5A is a perspective top view of an embodiment of a bottom portion of a fluidic switch.
Figure 5B:
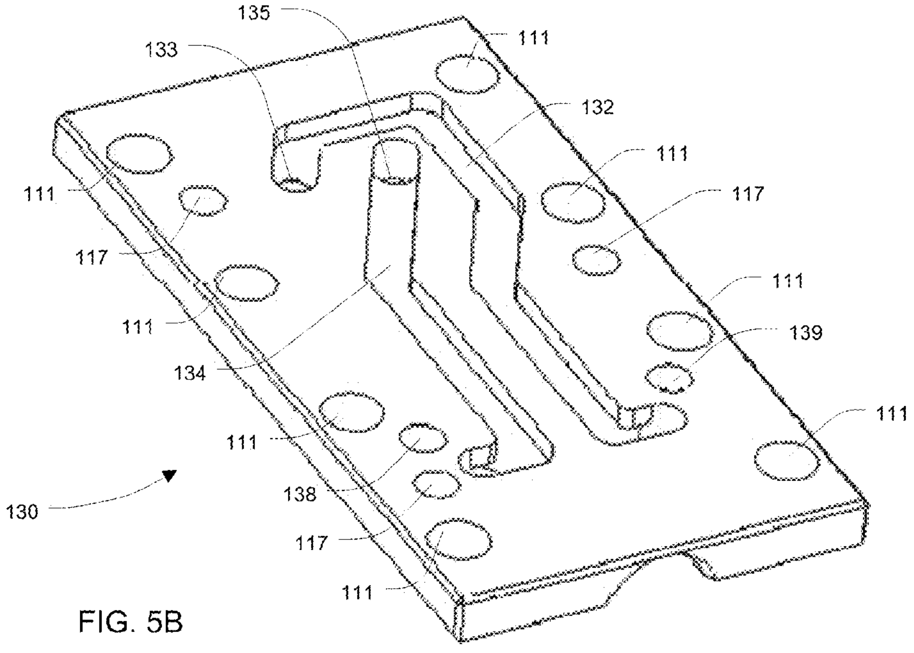
FIG. 5B is a bottom perspective view of the embodiment of FIG. 5A.
Figure 5C:
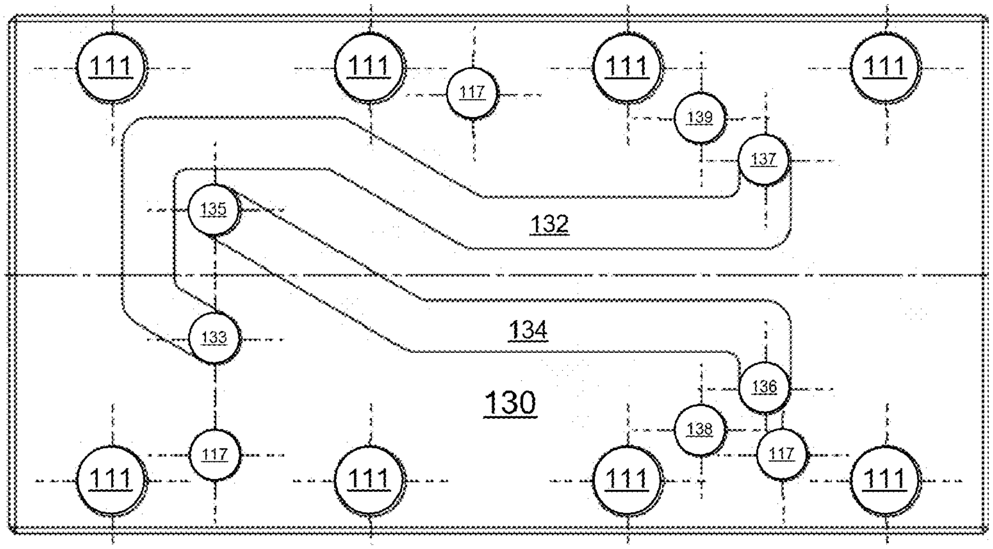
FIG. 5C is a bottom view of the embodiment of FIG. 5A.

FIGS. 5A-5C illustrate an embodiment of the bottom portion 130 of the fluidic switch 110. FIG. 5A is a perspective top view of the bottom portion 130, looking upstream, FIG. 5B is a perspective bottom view of the bottom portion 130, looking downstream, and FIG. 5C is a bottom view of the bottom portion 130. Profiles, that may accept sealing connectors, corresponding to the input power port 112 and the first and second power path 128, 124 are at the ends of the bottom portion 130. Also shown are the pin and fastener apertures 117, 111. The bottom portion 130 further comprises a first feedback port 136 and a second feedback port 137, which may connect to the first and second feedback paths 121, 125 of the top portion 120, respectively. Additionally, a first trigger port 138 and a second trigger port 139 are shown. The first and second trigger ports 138, 139 may connect to the first and second trigger paths 122, 126 of the top portion 120, respectively.

A third feedback port 135 and a fourth feedback port 133 are also shown. As shown in FIG. 5C, the third feedback port 135 is connected to the first feedback port 136 by a first feedback channel 134. Similarly, the fourth feedback port 133 is connected to the second feedback port 137 by a second feedback channel 132.

Fluid flow directed through the first power path 128 may also flow through the third feedback port 135, the first feedback channel 134, the first feedback port 136, the first feedback path 121, and into the connecting power path 114, creating a first feedback loop. A second feedback loop may be created with connections from the second power path 124, fourth feedback port 133, second feedback channel 132, second feedback port 137, and second feedback path 125.

Because the first and second feedback paths 121, 125 are configured to direct flow back into the input flow at an angle perpendicular to the input flow, fluid moving through the first or second feedback paths 121, 125 tends to influence which power path (first or second 128, 124) the input fluid may take. Upon injecting fluid into the input power path 112, fluid may flow through both the first and second power paths 128, 124, however the flow will likely be at least slightly stronger along one power path than the other. For example, if the flow is slightly stronger along the first power path 128, the third feedback port 135 may receive a stronger flow than the fourth feedback port 133. This stronger flow will result in a stronger feedback flow directed from the first feedback path 121 into the connecting power path 114. The stronger flow from the first feedback path 121 will strengthen the already slightly stronger flow to the first power path 128, which, in turn strengthens the first feedback loop. As such, the fluidic switch is generally configured to divert fluid down the first power path 128 or second power path 124, but not both.

As shown in FIG. 2A, the fluidic switch 110 is connected to the cap 140, and both are further connected to the bulkhead 150. The first and second power paths 128, 124 of the fluidic switch 110 connect to the bulkhead 150 (also shown in FIGS. 7A-7C), and are extended within the bulkhead 150 by a first bulkhead power path 156 and a second bulkhead power path 154, respectively. As illustrated by FIG. 2A, the first bulkhead power path 156 leads directly to the upstream portion of the cylinder 198, as separated from the downstream portion of the cylinder by the ring 167 of the piston 160. Fluid flowing through the first bulkhead power path 156 into or out of the upstream portion of the cylinder 198 may move the piston 160 (also shown in FIGS. 8A and 8B) downstream or upstream within the cylinder 198

As shown in FIG. 2B, the second bulkhead power path 154 leads to the outside of the bulkhead 150, and into the chamber 195 that is created between the housing 190 and the bulkhead 150. The chamber 195 may extend around the circumference of the bulkhead 150.

Referring now to FIG. 2C, a cut away view of the A-A cross section shown in FIG. 2F, the housing 190 comprises a housing path 197 from the chamber 195 to an opening 199 in the downstream side of the cylinder 198. Fluid flowing through the second bulkhead power path 154 into or out of the downstream side of the cylinder 198 may move the piston 160 upstream or downstream within the cylinder 198.

The piston 160 moves away from fluid that is injected into the cylinder, and as it moves, it pushes fluid that is in the cylinder back through the other power path. For example, if the piston 160 is in the middle of the cylinder 198 and if fluid is moved through the first power path 128, which extends through the bulkhead 150, into the upstream portion of the cylinder 198, the piston 160 will be pushed downstream, moving fluid from the downstream side of the cylinder 198 into the opening 199, through the housing path 197, into the chamber 195, through the second bulkhead power path, and into the second power path 124, where it will be caught by the sharp corner of the second well bore vent path 113, and may be vented through the second well bore vent port 113 into a well bore. Similarly, the cycle could be reversed to flow in the opposite direction, resulting in flow from the upstream portion of the cylinder 198 to be vented by the first well bore vent port 115 in a similar manner.

Figure 8A:
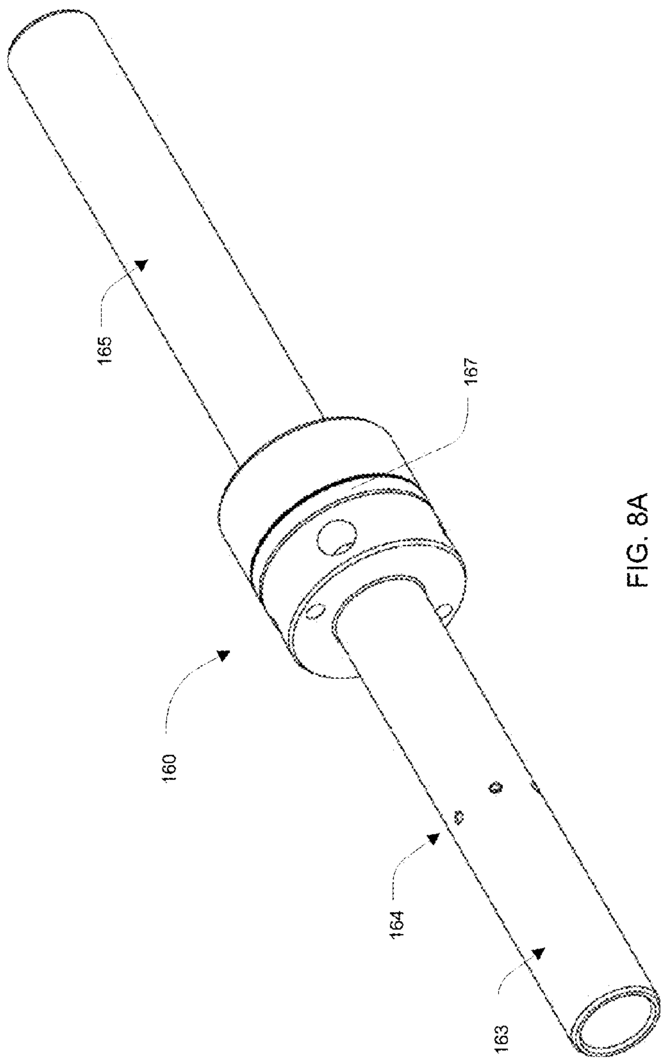
FIG. 8A is a perspective view of an embodiment of a piston.
Figure 8B:
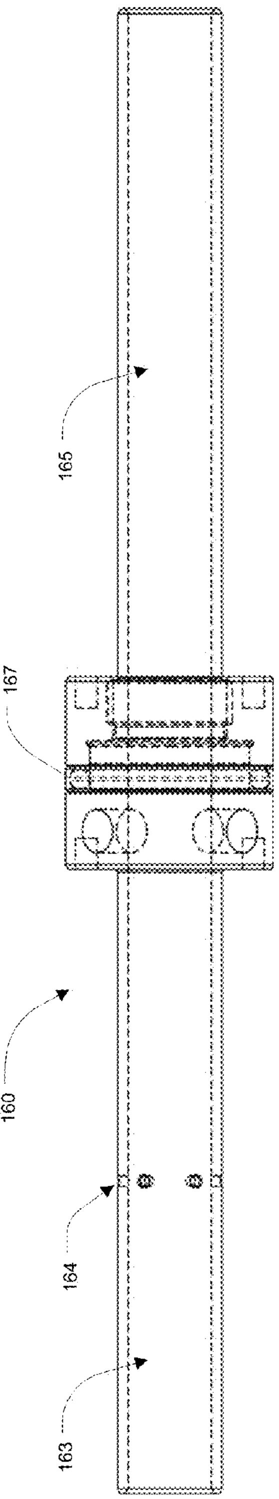
FIG. 8B is a transparent side view of the embodiment of FIG. 8A.

FIGS. 8A and 8B illustrate an embodiment of the piston 160. FIG. 8A is a perspective view, looking generally downstream, and FIG. 8B is a cutaway view of the piston 160. The piston 160 comprises an upstream end 163 and a downstream end 165 with a ring 167 between the two ends. The piston 160 is hollow, having a main piston passage 161 which conveys the input flow from the bulkhead 150. The piston 160 further comprises a piston trigger port 164 made from, for example, a plurality of apertures positioned in a line around the circumference of the upstream end 163. The upstream end of the piston 160 is accepted by the main bulkhead passage 151, while the downstream end of the piston 160 is accepted by the main interruption valve passage 171.

Figure 7A:
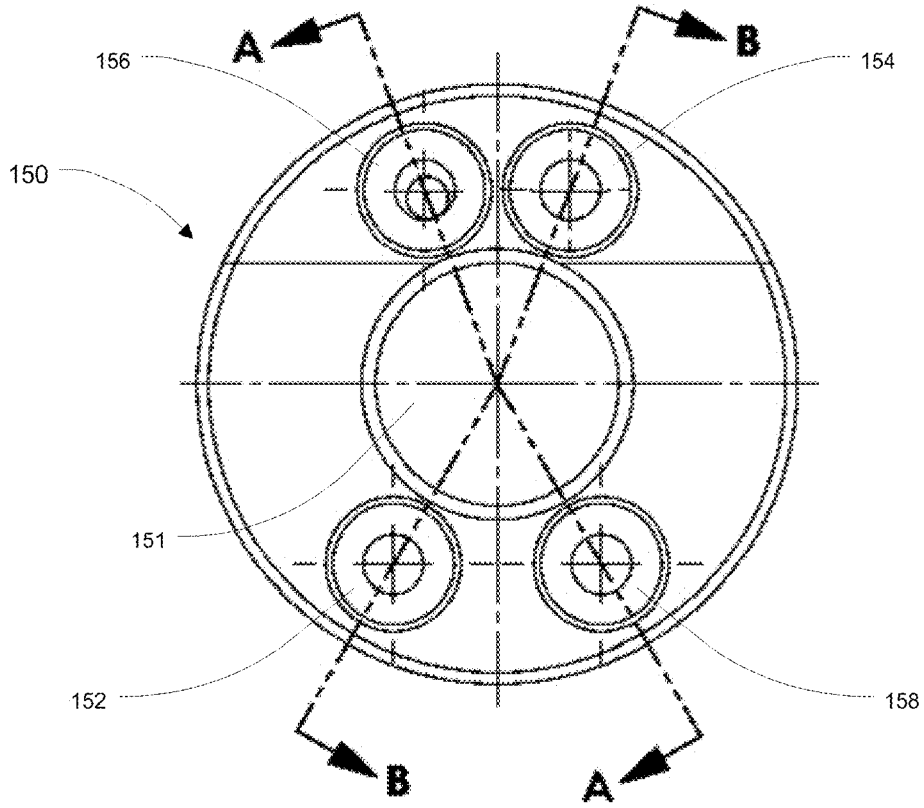
FIG. 7A is a front view of an embodiment of a bulkhead, looking downstream, showing cross section lines A-A and B-B.

Referring now to FIG. 2D, a cut away view of the D-D cross section shown in FIG. 2F, FIG. 2E, a cut away view of the H-H cross section shown in FIG. 2F, and FIGS. 7A, 7B, and 7C. FIG. 7A is a front view of the bulkhead 150, showing cross section lines. The bulkhead 150 further comprises a first trigger path 158 that connects to a first trigger port 159 (shown in FIGS. 2D and 7B) and a second trigger path 152 that connects to a second trigger port 153 (shown in FIGS. 2E and 7C). The trigger ports 159, 153 may be suitably sealed from fluid communication with other areas of the vibratory impulse generator assembly 100, as would be apparent to one of ordinary skill in the art, given the benefit of this disclosure.

Figure 7B:
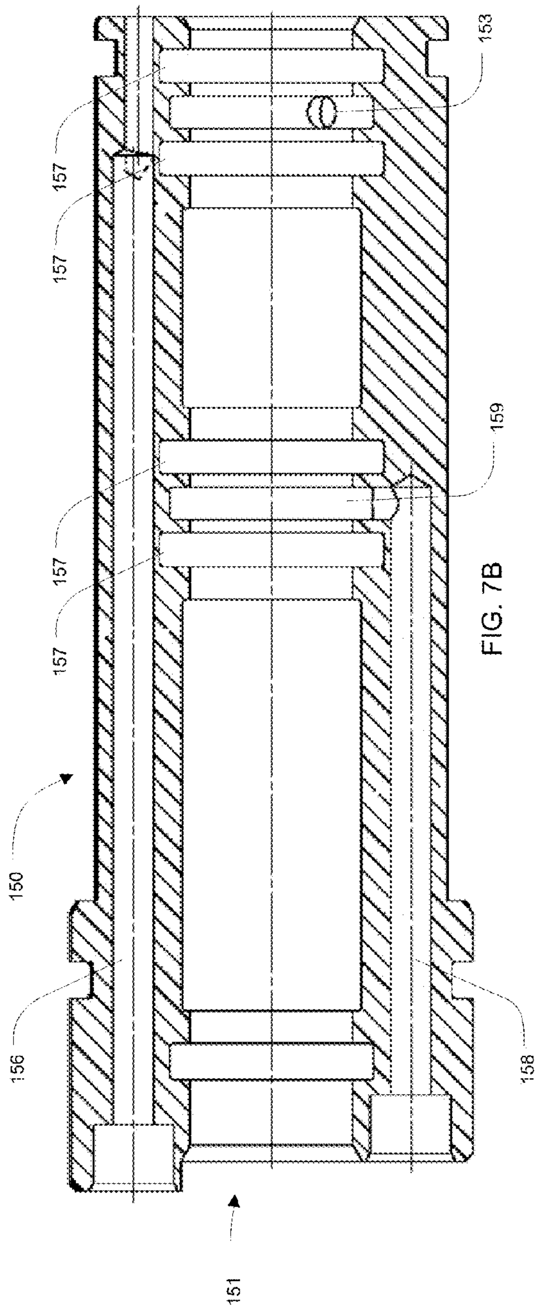
FIG. 7B is a cutaway side view of the embodiment of FIG. 7A, looking at the A-A cross section.

FIG. 7A illustrates a downstream view of the bulkhead 150 showing the positions of the first and second trigger paths 158, 152, the bulkhead main passage 151, and the first and second bulkhead power paths 156, 154, as well as two cross section lines, A-A and B-B. FIG. 7B is a view of the bulkhead 150 cutaway along A-A and FIG. 7C is a view of the bulkhead 150 cutaway along B-B.

As illustrated in FIGS. 2D and 7B, the first trigger port 159 is positioned such that it is in fluid communication with the piston 160 only when the piston 160 is near the top of the cycle (i.e. near its most upstream position). When the piston trigger port 164 moves into fluid communication with the first trigger port 159, the flow moving through the main bulkhead passage 151 is allowed to move through the piston trigger port 164 into the first bulkhead trigger port 159 and further into the first bulkhead trigger path 158.

Figure 7C:
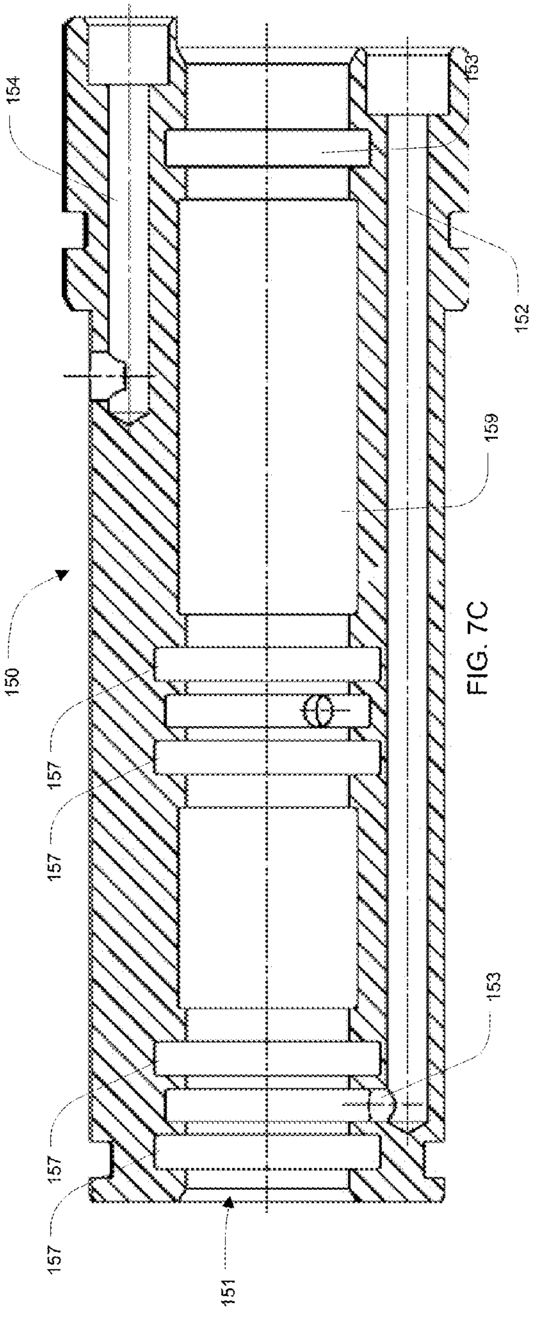
FIG. 7C is a cutaway side view of the embodiment of FIG. 7A, looking at the B-B cross section.

Similarly, FIGS. 2E and 7C show the second trigger port 153, which is positioned such that it is in fluid communication with the piston 160 only when the piston 160 is near the bottom of the cycle (i.e. near its most downstream position). When the piston trigger port 164 moves into fluid communication with the second trigger port 153, the flow moving through the main bulkhead passage 151 is allowed to move through the piston trigger port 164 into the second bulkhead trigger port 153 and further into the second bulkhead trigger path 152.

Figure 6B:
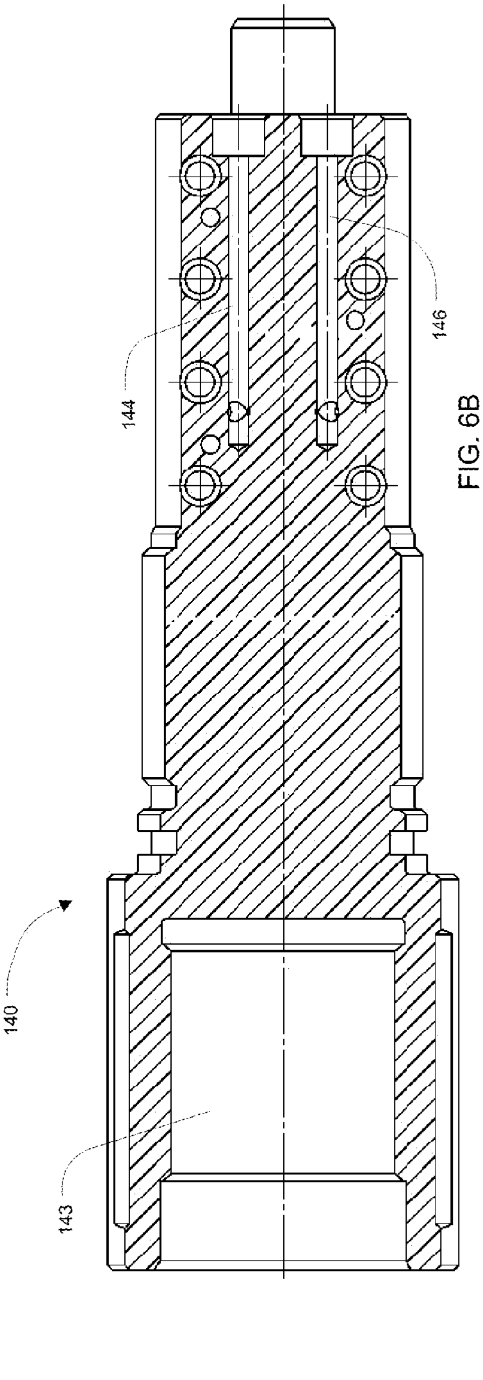
FIG. 6B is a cutaway top view of the embodiment of FIG. 6A.

As also illustrated in FIGS. 2D and 2E, the first and second bulkhead trigger paths 158, 152 connect back to the cap 140 at a first cap trigger path 146 and a second cap trigger path 144, respectively (best shown in FIG. 6B). The first and second cap trigger paths 146, 144 extend within the cap 140 until near the first and second trigger ports 122, 126 of the fluidic switch 110, then turn orthogonally to move vertically through the cap 140 toward the fluidic switch 110. The first cap trigger path 146 connects to the fluidic switch 110 at the second trigger port 138 (best shown in FIG. 5B) and the second cap trigger path 144 connects to the fluidic switch 110 at the first trigger port 139 (best shown in FIG. 5B). As previously discussed, both the first and second trigger ports 139, 138 extend through the bottom portion 130 to the top portion 120 of the fluidic switch 110, connecting with the first trigger path 122 and the second trigger path 126.

In operation, fluid from a power path, such as, for example, the first power path 128, may move the piston 160 until the second bulkhead trigger port 153 is in fluid communication with the piston trigger port 164. When the port 153 is in communication with the port 164, fluid from the main bulkhead passage 151 will be communicated to the second trigger path 126. The fluid will be at or near the full pressure of the main flow, which may be a high pressure relative to the pressure downstream from the first and second feedback paths 121, 125. The fluid moving through the second trigger path 126 will interrupt the first feedback loop, changing the behavior of and diverting the fluid to the second power path 124 rather than the first power path 128. As the flow moves to the second power path 124, the second feedback loop is established, strengthening the flow to the second power path 124.

As fluid flows through the second power path 124, fluid is delivered to the downstream from the piston 160, pressuring the piston 160 to move in the opposite direction, (i.e. upstream). A similar process takes place for the first bulkhead trigger 159, sending fluid to the first trigger port 122, interrupting the second feedback loop, and changing the fluid flow from the second power path 124 to the first power path 128.

Figure 9:
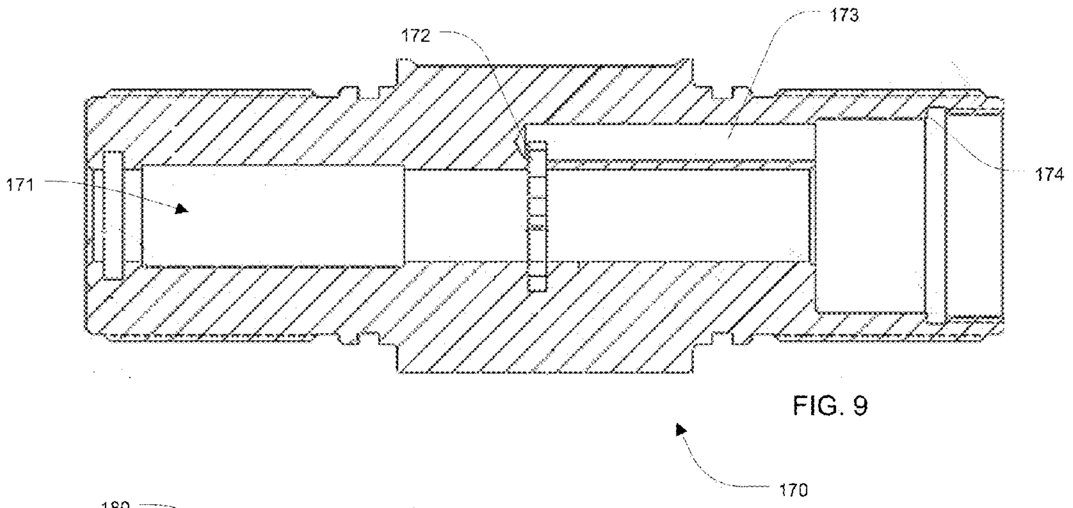
FIG. 9 is a cutaway side view of an embodiment of an interruption valve.

FIG. 9 illustrates an embodiment of an interruption valve 170. The interruption valve 170 comprises a main valve passage 171, through which the main fluid flow is directed, and which accepts the downstream portion 165 of the piston 160, and a plug profile 174 that may accept the plug 180 (as shown in FIG. 2A). The interruption valve 170 also has one or more bypass passages 173 and one or more connecting passages 172. The connecting passage 172 may be a single channel formed into the circumference of the main valve passage 171 or may be of another suitable configuration, as would be apparent to one of ordinary skill in the art, given the benefit of this disclosure.

Figure 10A:
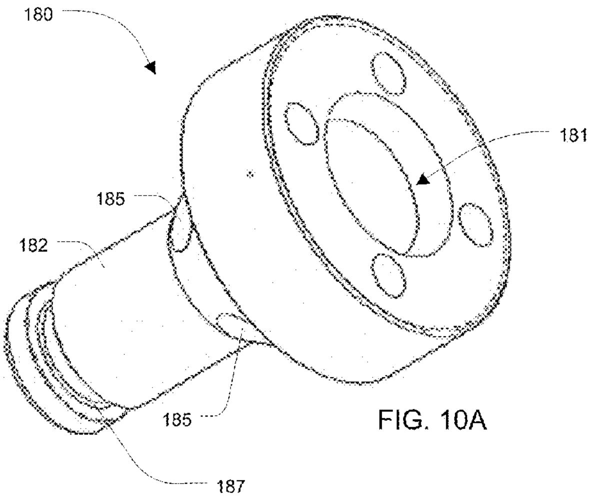
FIG. 10A is a perspective view of an embodiment of a plug.
Figure 10B:
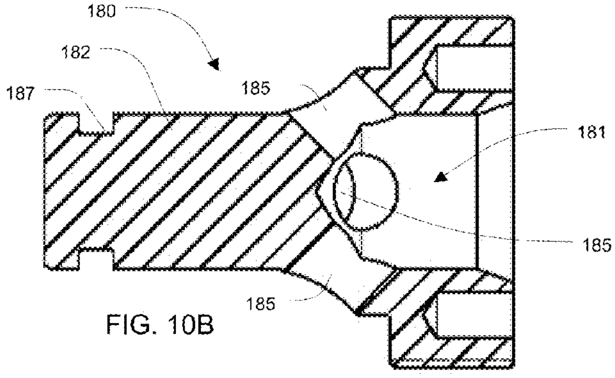
FIG. 10B is a cutaway side view of the embodiment of FIG. 10A.

FIG. 10A is a perspective view and FIG. 10B is a cutaway view of an embodiment of the plug 180. The plug 180 comprises a shank 182, a seal profile 187, four bypass apertures 185 and a main plug flow passage 181. The plug 180 may be installed in the downstream portion of the interruption valve. The shank 182 includes a seal profile 187 that may carry a seal to seal off and stop the main flow of fluid from moving through and out of the interruption valve 170 through the downstream portion of the main valve passage 171.

When fluid is flowing through the main valve passage 171, the connection passage 172 communicates fluid to the one or more bypass passages 173, which in turn communicate with the bypass apertures 185, moving the fluid through the apertures 185 and into the main plug passage 181.

Additionally, the plug 180 may act as a restriction to the main flow of fluid. A restriction to the main flow of fluid may allow the pressure within the passages connecting to the main flow of fluid to remain relatively constant, or at least at a high enough pressure to maintain proper operation.

Figure 10C:
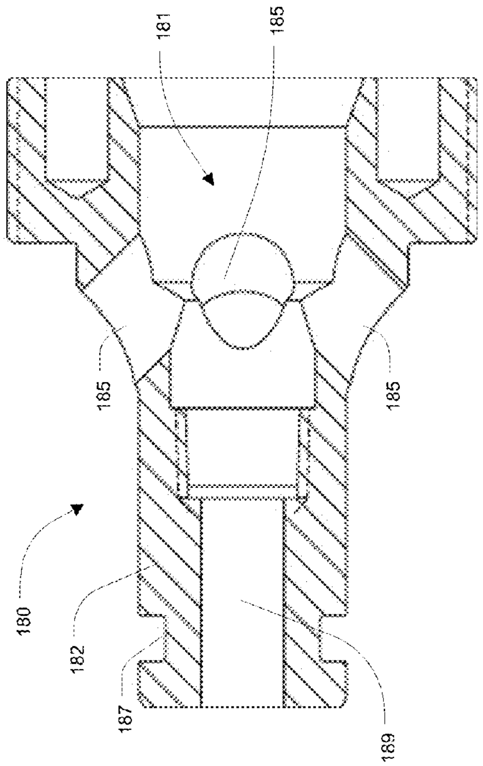
FIG. 10C is a cutaway side view of another embodiment of a plug.

FIG. 10C illustrates an alternative embodiment of a plug 180. It may be desirable to adjust the amplitude of an impulse while maintaining a flow rate through the vibratory impulse generator assembly 100. The amplitude of the impulse produced by the vibratory impulse generator assembly 100 may be substantially proportional to an interrupted rate of flow. As such, an adjustment to the impulse may be achieved by providing a route for a portion of a flow of fluid to effectively bypass the interrupt valve 170. For example, a pressure adjustment passage 189 might be provided through the shaft 182 of the plug 180. The size of the passage 189 may be chosen to reduce the amplitude of the impulse to a suitable size. Other passages, such as, for example, channels extending through the housing 190 or through the interrupt valve 170, may be formed to adjust the amplitude of an impulse, as would be apparent to one of ordinary skill in the art, given the benefit of this disclosure.

Figure 11:
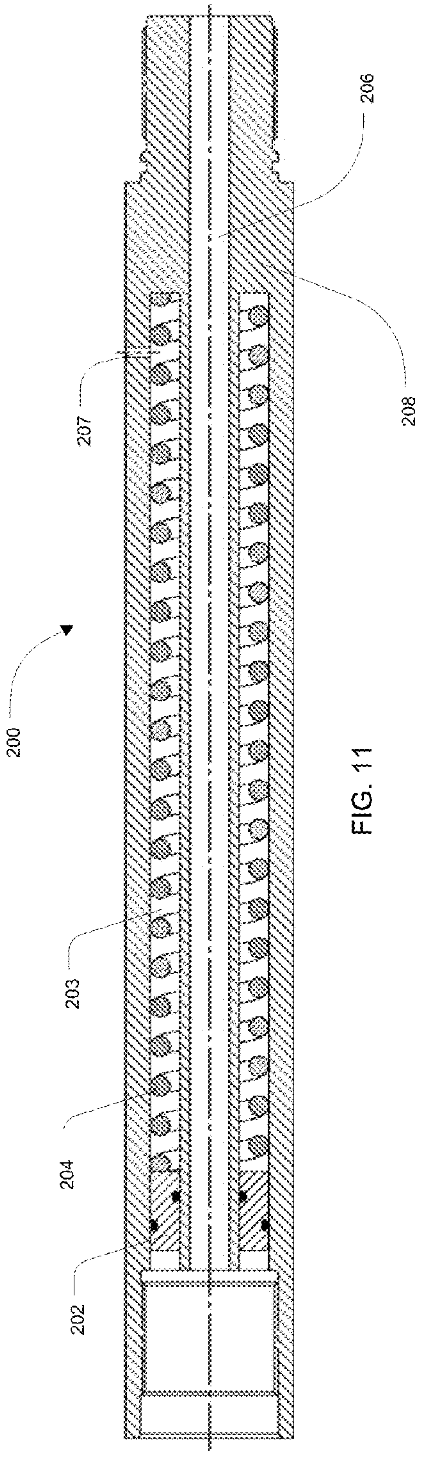
FIG. 11 is a cutaway side view of an embodiment of an accumulator.

FIG. 11 is an embodiment of an accumulator that may be connected to the vibratory impulse generator assembly 100, for example, downstream from the vibratory impulse generator assembly 100. As shown in FIG. 11, the accumulator comprises an accumulator body 208, an accumulator main passage 206, a spring 204 positioned within an annulus 203 and wrapped around the accumulator main passage 206, and a piston 202 positioned within the annulus 203 and connected to the spring 204. An accumulator wellbore vent 207 is also shown. The accumulator 200 may absorb impulses in a flow of fluid arriving from the vibratory impulse generator assembly 100 such that the pressure of a flow of fluid exiting the accumulator 200 is substantially steady. The flow of fluid may be used to power additional devices or tools, such as, for example a nozzle the may be used to direct a high velocity jet of fluid into the wellbore.

In operation, a pressure pulse of fluid may be input to the accumulator 200. The accumulator main passage 206 may act as a restriction to the flow of fluid, allowing a portion of the input fluid to flow as well as building up pressure. Additionally, devices or tools connected to the accumulator 200 may act as restrictions to the flow of fluid. Fluid from the input flow may act upon the piston 202, and thus, the spring 204, moving the piston 202 into the annulus 203 and energizing the spring 204. In this way, fluid that cannot instantly flow through the accumulator main passage 206 may be stored in the annulus 203. As fluid flows through the accumulator main passage 206, pressure from the pressure pulse of fluid may be reduced and the fluid stored within the annulus may be pushed out of the annulus 203 and into the accumulator main passage 206 by the piston 202 and spring 204. The storage and release of fluid within the annulus 203 may smooth the flow of fluid exiting the accumulator 200 such that the flow of fluid is substantially the same during the pressure pulse as it is after the pressure pulse. Additionally, The annulus 203 may be in fluid communication with the wellbore through the accumulator wellbore vent 207. Fluid may be located within the annulus 203 on both sides of the piston 202 and may be vented to the wellbore through the accumulator wellbore vent 207.

FIGS. 2D and 2E each illustrate the vibratory impulse generator assembly 100 with the piston 160 in a different position. As previously discussed, the piston is free to move in a path through the cylinder 198 and may be moved to one side or the other by fluid flow. FIG. 2D illustrates the piston 160 at or near the top of the cycle, while FIG. 2E illustrates the piston 160 at or near the bottom of the cycle. As shown in FIG. 2D, the upstream portion 163 of the piston 160 is in communication with the trigger port 159 and the downstream portion 165 upstream from the connection passage 172. Additionally, fluid may be flowing through the main cap passage 141, the main bulkhead passage 151, the main piston passage 161, the main valve passage 171, the connecting passage 172, the bypass passage 173, the bypass apertures 185, and downstream from the plug 180 through the main plug passage 181.

From this position the piston 160 may move downstream, toward the plug 180. At about halfway between the top and bottom of the cycle, the downstream portion 165 of the piston 160 reaches the connecting passage 172 and blocks it. Because the connecting passage 172 is formed as a thin ring extending around the circumference of the main valve passage 171, the connecting passage 172 is blocked off by the downstream portion 165 relatively quickly, stopping the flow of fluid relatively quickly, and creating an impulse or a positive pressure wave that jerks the vibratory impulse generator assembly 100 and other connected components. Movement due to the blockage of fluid flow is commonly referred to as the water hammer effect.

Even though the main flow is blocked, the piston may continue to move as normal. Fluid is still free to cycle through the fluidic switch 110, moving the piston 160, and venting out to the well bore through the well bore vents formed into the top portion 120 of the fluidic switch 110 and through one or more complementary well bore vents formed into the housing 190. As the piston continues to move downstream, fluid communication may be reached between the main flow and the trigger path 152 through the piston trigger port 164 and the second trigger port 153, changing the fluid flow and, consequently, the travel direction of the piston 160.

As the piston 160 moves upstream, the connecting passage 172 may be unblocked, and the main flow may be allowed to flow past the vibratory impulse generator assembly 100 again.

As described above, the vibratory impulse generator assembly 100 may generate an impulse like pressure wave that creates movement in the vibratory impulse generator assembly 100 and in associated components. An impulse can be thought of as a concentrated burst of energy. Where a gradual release of energy may be less effective or not effective at all, an impulse may efficiently and effectively impart energy to a system. Though only one cycle was described, many cycles may be made, creating a substantially square wave. A device which creates a square wave, such as a vibratory impulse generator assembly 100, may be used to reduce the effective friction between tubing and a casing and/or a wellbore.

Because an embodiment of a vibratory impulse generator assembly 100 in accord with the current disclosure has only one moving part, the assembly 100 has a plurality of advantages. For example, fewer parts generally equates to less maintenance, as well as being easier to assembly, and to operate. Additionally, the disclosed embodiment may be tolerant of gases within its chambers and passages and may be tolerant of a wide range of fluids By contrast, a traditional motor may be difficult to start and/or operate in environments where gases may be introduced into the flow.

Further, vibratory devices that use a mud motor necessarily employ contacting moving parts, the moving parts being typically made from elastomeric materials, which may be damaged by fluids such as acids, solvents, and/or high pressure gases. Such damaging materials are common in a wellbore and may prevent extended use of mud motors with elastomeric portions. By contrast, the disclosed vibratory impulse generator assembly 100 may be manufactured from materials which are resistant to the above mentioned damaging materials and so may be used in their presence.

Further, because the disclosed embodiment of a fluidic switch 110 has no moving parts, it may be considered a solid state device. Solid state devices are simple to operate and maintain, and may be used across a relative wide range of pressures and temperatures. The ability to work in a higher pressure range may result in a greater impulse generated by the vibratory impulse generator assembly 100.

By contrast, known prior art devices are relatively complex, having a larger number of moving parts that must fit together precisely for proper operation. Temperature and/or pressure may change the size and/or shape of an object, which may result in an improper or arrested operation. For example, the fluidic switch may operate within a temperature range of 0 to 300 C By contrast, prior art that uses a traditional vibratory device, such as a mud motor, may only be generally operable between 0 to 150 C.

Additionally, because of the simple design and small amount of moving parts, an embodiment of a vibratory impulse generator assembly in accord with the current disclosure may have a total length of about two feet from the cap to the plug. By contrast, known prior art devices may be about six feet in length.

While a vibratory impulse generator assembly 100 may be helpful, for example, for moving tubing through a casing, the vibratory impulse generator assembly 100 may not enhance the operation of other devices located on the same tubing and/or powered by the same fluid flow. For example, the vibration from the vibratory impulse generator assembly 100 may impede the efficacy of a fluid delivery tool or a fluid powered tool. Also, vibrations from the vibratory impulse generator assembly 100 may adversely affect the reliability of a connected tool. As such, the ability to turn the vibratory impulse generator assembly 100 on and off may be helpful. Further, the ability to remotely turn the vibratory impulse generator assembly 100 on or off may be helpful.

The vibratory impulse generator assembly 100 may be modified to be turned on with a suitable object, such as, for example, a ball or a dart, which may be pumped downstream to the vibratory impulse generator assembly 100. For example, the plug may comprise an addition tapered flow passage through the shank 182 of the plug 180, connecting to the main plug passage 181. The tapered flow passage may pass fluid from the main piston passage 161 through the main plug passage 181 regardless of the position of the piston 160. To turn on the vibratory impulse generator assembly 100, a ball having a complementary size to the tapered flow passage may be pumped downstream to the plug 180 and may block the tapered flow passage, leaving only the bypass passage 173 open to fluid flow, i.e. turning on the vibratory impulse generator assembly 100. As discussed previously, the oscillation of the piston 160 blocks and unblocks the connecting passage 172, generating impulses.

Additionally, the vibratory impulse generator assembly 100 may be turned off with a suitable ball pumped downstream to the vibratory impulse generator assembly 100. In another example, the vibratory impulse generator assembly 100 may comprise a sleeve, having a ball catching profile, which may block a bypass port upstream or downstream from piston 160, interruption valve 170, or the vibratory impulse generator assembly 100. The sleeve may be configured to catch a ball that is pumped downstream, blocking the main flow and creating a pressure build up. At a defined pressure, the sleeve may shift or move such that the associated bypass port is unblocked, enabling fluid flow to bypass the interruption valve 170. The sleeve may be, for example, a crush sleeve, or may be held in place by a shear pin or may be configured to unblock the bypass port in another suitable way, as would be apparent to one of ordinary skill in the art given the benefit of this disclosure.

Although this invention has been described in terms of certain preferred embodiments, other embodiments that are apparent to those of ordinary skill in the art, including embodiments that do not provide all of the features and advantages set forth herein, are also within the scope of this invention. Therefore, the scope of the present invention is defined only by reference to the appended claims and equivalents thereof.

What is claimed is:

1. A method of generating a periodic impulse comprising:

injecting fluid through a first power path into a first side of a cylinder, the cylinder being filled with fluid, the injection causing a piston positioned within the cylinder to move away from the first side of the cylinder, the piston pushing fluid out of a second side of the cylinder;

injecting fluid through a first feedback path into the first power path;

blocking a first port with at least a portion of the piston to substantially stop a flow of a fluid through a main passage, thereby creating an impulse;

injecting fluid from a second trigger port, wherein the injection of fluid from the second trigger port interrupts the injection of fluid though the first feedback path;

injecting fluid through a second power path into the second side of the cylinder, the injection causing the piston to move away from the second side of the cylinder, the piston pushing fluid out of the first side of the cylinder;

injecting fluid through a second feedback path into the second power path; and unblocking the first port.

2. The method of claim 1, further comprising creating fluid communication between the main passage and a first trigger port when the piston is near the first side of the cylinder, and wherein the fluid communication between the main passage and the first trigger port stops the injection of fluid into the second side of the cylinder and starts the injection of fluid into the first side of the cylinder.

3. The method of claim 1, wherein the fluid is injected by a fluidic switch.

4. The method of claim 3, wherein the fluidic switch is a solid state device.

5. The method of claim 1, further comprising smoothing the flow of the fluid through the main passage such that the flow is substantially the same at a first time and a second time, the first time being after the first port is blocked, the second time being after the first port is unblocked.

6. The method of claim 1, further comprising adjusting the amplitude of the impulse by allowing a portion of the flow of fluid to bypass the main passage.

7. The method of claim 1, wherein the injection of fluid though the first feedback path into the first power path reinforces a flow of fluid flowing through the first power path.

8. The method of claim 7, wherein the injection of fluid though the second feedback path into the second power path reinforces a flow of fluid flowing through the second power path.

* * * * *